United States Patent [19]

Babb

[11] 4,403,885
[45] Sep. 13, 1983

[54] CABLE CONNECTOR

[75] Inventor: Larry F. Babb, Lorain County, Ohio

[73] Assignee: Emerson Electric Co., St. Louis, Mo.

[21] Appl. No.: 252,312

[22] Filed: Apr. 9, 1981

[51] Int. Cl.³ .............................................. F16D 1/00
[52] U.S. Cl. .................................... 403/317; 403/331; 403/381
[58] Field of Search ............... 403/319, 327, 331, 328, 403/322, 323, 381, 315, 9, 324

[56] References Cited

U.S. PATENT DOCUMENTS

| | | | |
|---|---|---|---|
| 693,595 | 2/1902 | Frazier | 403/319 |
| 929,234 | 7/1909 | Mather | 403/381 X |
| 1,303,090 | 5/1919 | McCray | 403/331 X |
| 2,278,324 | 3/1942 | Kollmann | 403/182 |
| 2,309,249 | 1/1943 | Karp. | |
| 2,639,931 | 5/1963 | Kandle. | |
| 2,755,115 | 7/1956 | Kollmann | 403/9 |
| 2,832,246 | 4/1958 | Livermont | 403/331 X |
| 2,892,649 | 6/1959 | Kollmann. | |
| 4,042,305 | 8/1977 | Vincent | 403/328 X |
| 4,185,935 | 1/1980 | Bierlein | 403/324 X |

FOREIGN PATENT DOCUMENTS

| | | |
|---|---|---|
| 2183352 | 1/1973 | France. |
| 167465 | 10/1922 | United Kingdom. |
| 1100040 | 1/1968 | United Kingdom. |
| 1413767 | 11/1975 | United Kingdom. |
| 317775 | 5/1972 | U.S.S.R. ............................. 403/324 |

Primary Examiner—Andrew V. Kundrat
Attorney, Agent, or Firm—Polster, Polster and Lucchesi

[57] ABSTRACT

A cable connector for flexible sewer cleaning rods includes a male coupling member and a female coupling member, engageable by transverse sliding. A locking pin extends through a transverse bore in the female coupling member and through a transverse slot in the head of the male coupling member. The pin is rotatable and includes a cut-out on one lateral side thereof, the cut-out being sized to permit the male member to slide out of the slot when the cut-out is rotated toward the male member.

15 Claims, 7 Drawing Figures

CABLE CONNECTOR

BACKGROUND OF THE INVENTION

This invention relates to a connector or coupling device, and in particular to a coupling device adapted for use with helically wound rods for a sewer cleaning device.

The difficulties in coupling lengths of sewer-cleaning rods together, and the dire consequences should the coupling device fail, have long been known.

A number of connectors for lengths of sewer-cleaning rod have been devised, but all have drawbacks, such as not locking positively, being difficult to assemble and disassemble, including loose parts which are easily lost, or requiring special tools for assembly and disassembly.

An example of a previously-known sewer rod coupling is Kollmann, U.S. Pat. No. 2,755,115, in which a male portion having an enlarged head and a neck extending transverse of the axis of the sewer-cleaning rod is slipped into a corresponding transverse slot in a female portion. A spring-loaded, axially extending locking pin extends through the end of the male portion and into the female portion. The parts are separated by inserting a tool into a transverse bore in the female part to retract the pin.

Another example is Kollmann, U.S. Pat. No. 2,278,324 in which a male portion of the connector includes a shoulder extending transverse of the axis of the sewer-cleaning rod. The shoulder is slipped into a corresponding transverse slot in a female portion, and a locking bolt extending at right angles to both the shoulder and the axis of the sewer-cleaning rod locks the two parts together. The bolt is held in place by a spring between its head and the shoulder and by a U-shaped washer in a groove at the distal end of the bolt. To separate the parts, the U-shaped washer is removed from its groove, and the bolt and spring are removed.

A commonly utilized connector incorporates features of both these patents: a male portion having a transverse head and neck portion is slipped into a corresponding slot on a female portion, to hold the sections of rod to which they are attached against axial separation. A locking pin, corresponding to the locking bolt of Kollmann U.S. Pat. No. 2,278,324, prevents the two halves of the coupling from being slipped apart transversely. The locking pin is held frictionally in a bore through the female part and extends through a slot in the neck of the male part. Releasing the parts requires driving the locking pin from the bore.

SUMMARY OF THE INVENTION

One of the objects of this invention is to provide a connector for coupling sections of sewer-cleaning rod or the like which positively locks the sections together, but which is easy to assemble and disassemble, even after extended use.

Another object is to provide such a connector which does not require special tools to assemble and disassemble and which does not have loose parts.

Another object is to provide such a connector which may be completely disassembled for cleaning or repair.

Another object is to provide such a connector which is simple and inexpensive to manufacture.

Other objects will occur to those skilled in the art in light of the following description and accompanying drawings.

In accordance with this invention, generally stated, a cable connector for flexible rods or the like is provided which includes a first coupling member and a second coupling member. Each of the coupling members includes means at one axial end thereof for connecting the member to a flexible rod or the like. The first member comprises, at the second axial end thereof, a transversely elongated male member having a neck and an enlarged head, the head having an aperture through it generally perpendicular to the direction of its elongation. The second member comprises, at the second axial end thereof, a transverse slot proportioned to receive the head and neck of the first member for preventing axial separation of the first and second members when the head is in the slot. The second member further comprises a transverse bore extending generally perpendicular to the slot, the bore and the aperture in the head being at least partially aligned when the male member is received in the slot. A pin is positionable through the bore and the aperture to lock the first and second members by preventing sliding movement of the male member in the slot. The invention is particularly characterized in that the aperture in the head of the first member extends through the second axial end of the first member, and the bore in the second member intersects a portion only of the slot; the pin includes a cut-out on its lateral side which can be moved into general alignment with the slot to permit the head of the first member to slide from the slot. Preferably, biasing means are provided for holding the pin in a position to prevent separation of the two parts.

In the preferred embodiment, the pin is rotatable in the bore, and means are provided at one axial end of the pin for rotating the pin about its axis. The cut-out is sized to permit the male member to slide out of the slot when the cut-out is rotated toward it. Preferably, the means at one axial end of the pin comprise a slot engageable by a screwdriver or even a coin.

Preferably, a detent is provided for holding the pin in the bore. The detent preferably includes a circumferentially extending groove in the pin and spring means in the second member for engaging the groove. Preferably, the second member comprises an axially extending blind hole opening into the bore and the spring means is a coil spring in the blind bore. Also preferably, the spring means further comprises a ball positioned to engage the groove. When the pin is turned to lock the parts together, the ball engages the cut-out, and the ball and cut-out act as the biasing means.

In an alternative embodiment, the pin is mounted for reciprocal movement in the bore.

Preferably, the head of the male part is generally round in cross section.

Also preferably, the bore extends through the second member, and slots are provided at both axial ends of the pin.

Other aspects of the invention will best be understood in light of the following description of the preferred embodiment.

DESCRIPTION OF THE PREFERRED EMBODIMENT

Figure 1:
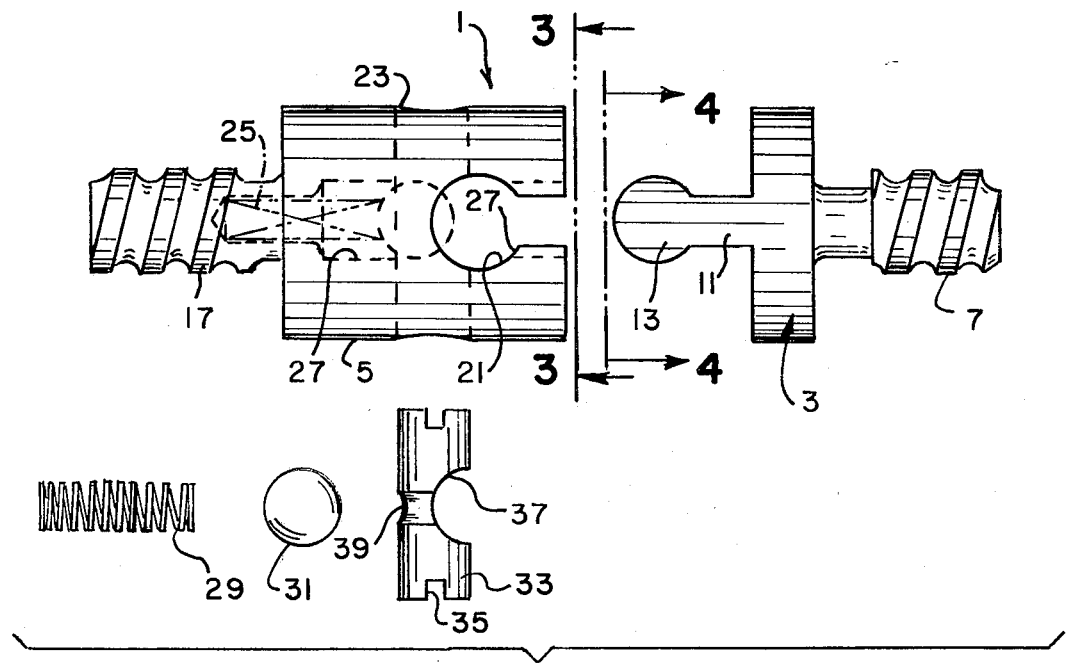
FIG. 1 is a view in side elevation of a cable connector of the present invention, showing the parts thereof separated.
Figure 2:
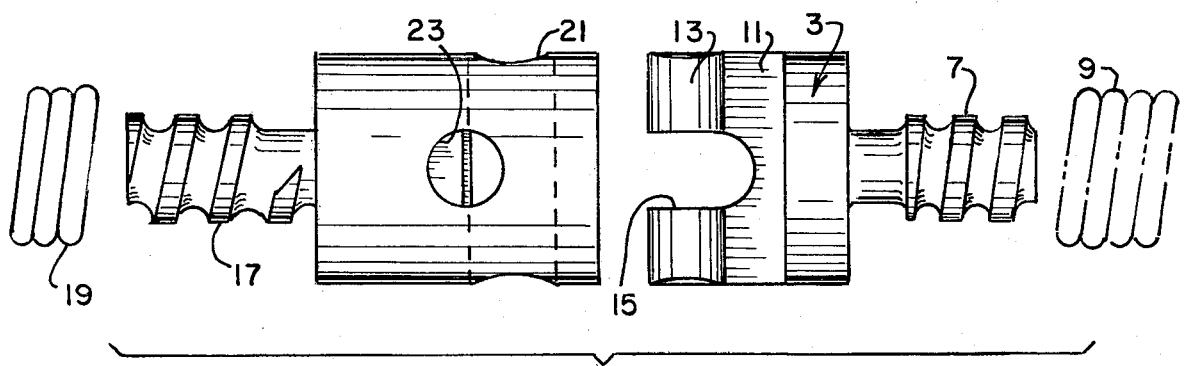
FIG. 2 is a top plan view thereof, showing the interior parts of the female coupling part assembled.
Figure 3:
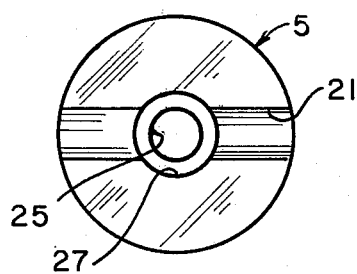
FIG. 3 is a view in axial end elevation of the female coupling part of the present invention, as indicated by line 3—3 of FIG. 1.
Figure 4:
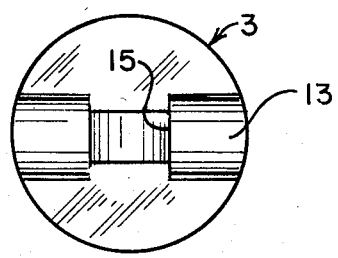
FIG. 4 is a view in axial end elevation of the male coupling part of the present invention, as indicated by line 4—4 of FIG. 1.

Referring now to the drawings, reference numeral 1 indicates a connector of the present invention. The connector 1 includes a male coupling part 3 and a female coupling part 5, both round in cross-section.

The male coupling part 3 includes a tail part 7 at one axial end for engaging an axial end of a first section of coiled sewer-cleaning rod 9. The other end of the male coupling part 3 includes a transversely elongated neck 11 and enlarged head 13. An aperture 15 extends through the edge of the head 13 at the center of the head 13 and into the neck 11. The aperture 15 is perpendicular to the direction of elongation of the head 13 and neck 11.

The female coupling part 5 includes a tail part 17 at one axial end for engaging an axial end of a second section of coiled sewer-cleaning rod 19. The other end of the female coupling part 5 includes a transverse keyhole slot 21, proportioned to receive the head 13 and neck 11 of the male coupling part 3. The fit between the slot 21 and the head 13 and neck 11 may be chosen to provide a desired amount of play between the two coupling parts of the connector 1.

The female coupling part 5 also includes a transverse bore 23 extending through the body of the female coupling part 5 in a direction normal to both the axis of the part and to the axis of the elongate keyhole slot. The keyhole slot 21 intersects one half of the transverse bore 23.

The female coupling part 5 also includes an axial blind bore 25 extending through the mouth of the slot 21, through the head of the keyhole slot 25, and into the tail part 17. The axial bore 25 is counterbored into the body of the female coupling part 5, as indicated at 27. A coil compression spring 29 is seated in the axial bore 25. A stainless steel ball 31 is slidable within the counterbore 27 and is urged outwardly by the spring 29.

Journalled in the transverse bore 23 is a locking pin 33. Both ends of the locking pin 33 are slotted, as shown at 35, for rotating the pin 33. At the center of the pin 33, a transverse semi-cylindrical cut-out 37 is provided in the pin 33. The cut-out 37 is sized to conform to the margin of the head of the keyhole slot 21 when the pin 33 is rotated so that the cut-out 37 faces the male coupling part 3, as shown in FIG. 1. The pin 33 also includes a central circumferential groove 39 which is engaged by the ball 31. The spring 29, ball 31 and groove 39 thus act as a detent for holding the pin 33 in the transverse bore 23 when the pin is turned to release the two coupling parts, as described hereinafter.

The female coupling part 5 is assembled by inserting the spring 29 into the axial blind bore 25, then inserting the ball 31 into the counterbore 27, and finally inserting the locking pin 33 into the transverse bore 23 while manually retracting the ball 31 into the counterbore 27. The position of the ball 31 shown in broken lines in FIG. 1 indicates its position when the locking pin 33 is out of the transverse bore 23. When the pin 33 is positioned, the ball 31 is pushed into the groove 39 or cut-out 37, and tends to prevent further movement of the pin into the transverse bore 23.

Figure 5:
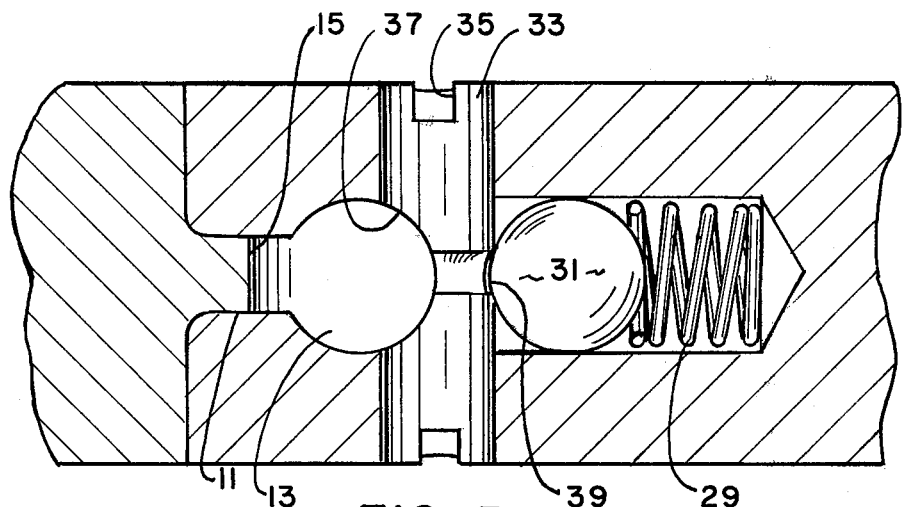
FIG. 5 is a view in axial cross section of the assembled connector, viewed from above, with the male coupling part on the left of the drawing, showing the locking pin rotated to a position in which the coupling parts are released and may be slid apart.

The male coupling part 3 and the female coupling part 5 are connected by rotating the pin 33 to the position shown in FIG. 5, with the cut-out 37 facing the male coupling part 3, by means of a screwdriver (or other implement such as a coin) placed in one of the slots 35. The head 13 and neck 11 of the male part 5 are slid transversely into the slot 21 of the female part 3, as shown in FIG. 5.

Figure 6:
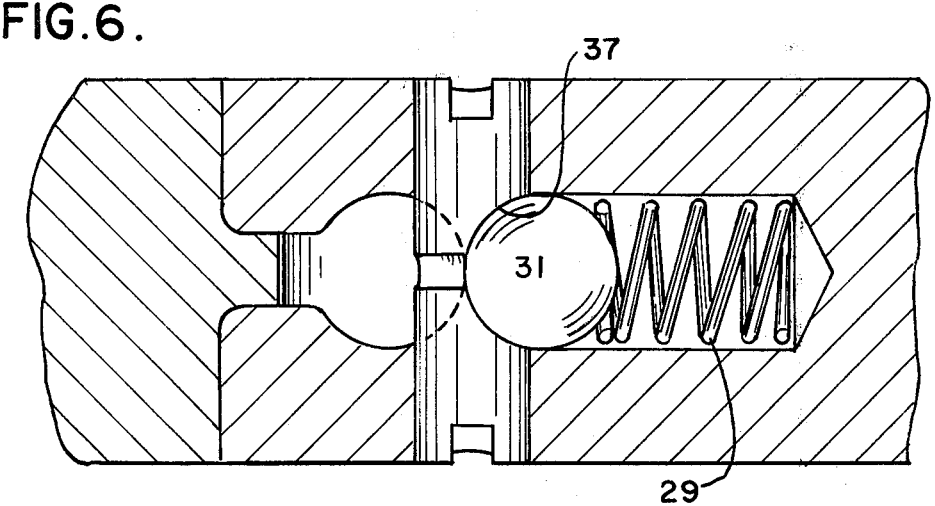
FIG. 6 is a view in axial cross section of the assembled connector, corresponding to FIG. 5, showing the locking pin rotated to a position in which the coupling parts are locked together.

The pin 33 is then rotated 180° to the position shown in FIG. 6 to lock the parts 3 and 5 together. In this position, the pin 33 extends into the aperture 15 in the head 13 of the male part 3 and prevents sliding movement between the two parts. Further rotation of the pin 33 is impeded because the ball 31 is urged into the cut-out 37 by the spring 29. The ball 31 thus provides additional resistance to rotation of the pin 33 as well as to movement of the pin 33 in the direction of its axis when the two coupling parts are locked together.

The two coupling parts 3 and 5 are separated merely by rotating the locking pin 33 an additional 180° to its original position. The two coupling parts 3 and 5 are then slid apart transversely.

Should it ever be necessary to clean the spring 29 or ball 31, the pin 33 is easily driven out of the bore 23 when the pin is rotated to its "open" position.

Figure 7:
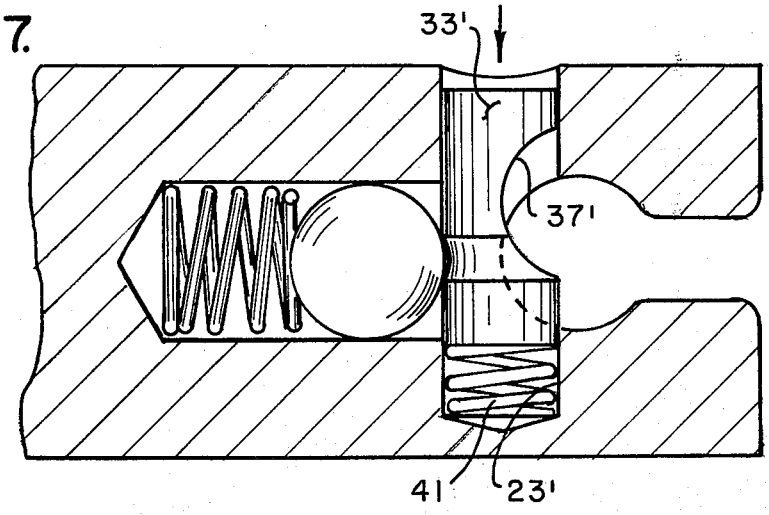
FIG. 7 is a view in axial cross section of a second embodiment of the male coupling part of the invention.

Numerous variations in the cable connector of the present invention, within the scope of the appended claims, will occur to those skilled in the art in light of the foregoing disclosure. By way of example, other detent means may be used, and the shape of the head 13 and slot 21 may be modified. The second slot 35 at the axial end of the pin 33 may be omitted. Although it is not presently preferred, the embodiment shown in FIG. 7 offers some of the advantages of the preferred embodiment. In the embodiment of FIG. 7, the transverse bore is a blind bore 23' in the bottom of which a compression spring 41 urges upward (as viewed in FIG. 7) a locking pin 33'. A cut-out 37' in the lateral side of the pin 33' is sized and positioned to unlock the male part 3 and female part 5 only when the locking pin 33' is manually depressed. In this embodiment, the locking pin 33' and its bore 23' may be shaped to make the pin 33' non-rotatable if desired. These variations are merely illustrative.

I claim:

1. In a cable connector for flexible rods or the like, said connector including a first coupling member and a second coupling member, each of said coupling members including means at one axial end thereof for connecting said member to a flexible rod or the like, said first member comprising, at the second axial end thereof, a transversely elongated male member having a neck and an enlarged head, said head having an aperture through it generally perpendicular to the direction of its elongation, said second member comprising, at the second axial end thereof, a transverse slot proportioned to receive said head and neck of said first member for preventing axial separation of said first and second members when said head is in said slot, said second member further comprising a transverse bore extending generally perpendicular to said slot, said bore and said aperture in said head being at least partially aligned when said male member is received in said slot, and a pin positionable through said bore and said aperture to lock said first and second members by preventing sliding movement of said male member in said slot, the improvement wherein said aperture in said head of said first member extends through said second axial end of said first member, wherein said bore in said second member intersects a portion only of said slot, wherein said pin incudes a cut-out on a lateral side thereof, said cut-out being sized to permit said male member to slide out of said slot when said cut-out is generally aligned with said slot, wherein said pin is movable in said bore from a locking position in which it prevents separation of said male and female members to an unlocking position in which said cut-out is generally aligned with said slot, wherein said second member comprises an axially extending blind bore opening into said bore for said pin, and wherein said second member further comprises detent means for holding said pin in said bore, said detent means comprising a coil spring in said blind bore.

2. The improvement of claim 1 wherein said detent means further include a groove in said pin, said detent means further comprising a ball positioned to engage said groove.

3. The improvement of claim 1 wherein said pin is rotatable about its axis from said locking position to said unlocking position, and wherein said pin includes means at one axial end thereof for rotating said pin about its axis.

4. The improvement of claim 1 wherein said head is generally round in cross section.

5. The improvement of claim 1 wherein said pin is axially slidable in said bore from said locking position to said unlocking position.

6. In a cable connector for flexible rods or the like, said connector including a first coupling member and a second coupling member, each of said coupling members including means at one axial end thereof for connecting said member to a flexible rod or the like, said first member comprising, at the second axial end thereof, a transversely elongated male member having a neck and an enlarged head, said head having an aperture through it generally perpendicular to the direction of its elongation, said second member comprising, at the second axial end thereof, a transverse slot proportioned to receive said head and neck of said first member for preventing axial separation of said first and second members when said head is in said slot, said second member further comprising a transverse bore extending generally perpendicular to said slot, said bore and said aperture in said head being at least partially aligned when said male member is received in said slot, and a pin positionable through said bore and said aperture to lock said first and second members by preventing sliding movement of said male member in said slot, the improvement wherein said aperture in said head of said first member extends through said second axial end of said first member, wherein said bore in said second member intersects a portion only of said slot, wherein said pin includes a cut-out on a lateral side thereof, said cut-out being sized to permit said male member to slide out of said slot when said cut-out is generally aligned with said slot, wherein said pin is rotatable about its axis in said bore from a locking position in which it prevents separation of said male and female members to an unlocking position in which said cut-out is generally aligned with said slot, wherein said pin includes means at one axial end thereof for rotating said pin about its axis, and wherein said cable connector includes detent means for holding said pin in said bore, said detent means including a circumferentially extending groove in said pin and spring means in said second member for engaging said groove.

7. The improvement of claim 6 wherein said spring means of said detent means engages said groove in said pin when said pin is in said unlocking position and wherein said spring means engages said cut-out in said pin when said pin is in said locking position.

8. The improvement of claim 7 wherein said spring means comprise a coil spring and a ball between said coil spring and said pin, said ball engaging said cut-out when said pin is in said locking position.

9. The improvement of claim 8 wherein interaction of said spring means and said cut-out impedes rotation of said pin out of said locking position.

10. The improvement of claim 9 wherein said second member comprises an axially extending blind bore opening into said bore for said pin, said coil spring extending into said blind bore.

11. The improvement of claim 7 wherein interaction of said spring means and said cut-out impedes rotation of said pin out of said locking position.

12. The improvement of claim 7 wherein said second member comprises an axially extending blind bore opening into said bore for said pin, said spring means extending into said blind bore.

13. The improvement of claim 6 wherein said second member comprises an axially extending blind bore opening into said bore for said pin, said spring means extending into said blind bore.

14. The improvement of claim 6 wherein said means at one axial end of said pin comprise a slot engageable by a screwdriver.

15. The improvement of claim 14 wherein said bore extends through said second member, and wherein slots are provided at both axial ends of said pin.

* * * * *